(12) United States Patent
Cvet et al.

(10) Patent No.: US 8,965,893 B2
(45) Date of Patent: Feb. 24, 2015

(54) SYSTEM AND METHOD FOR GROUPING MULTIPLE STREAMS OF DATA

(75) Inventors: Michael Cvet, Toronto (CA); Periklis Andritsos, Toronto (CA); Francisco Estrada, Toronto (CA); Darius Braziunas, Toronto (CA)

(73) Assignee: Rogers Communications Inc., Toronto, Ontario (CA)

( * ) Notice: Subject to any disclaimer, the term of this patent is extended or adjusted under 35 U.S.C. 154(b) by 523 days.

(21) Appl. No.: 12/857,688

(22) Filed: Aug. 17, 2010

(65) Prior Publication Data

US 2011/0093464 A1 Apr. 21, 2011

Related U.S. Application Data

(60) Provisional application No. 61/251,813, filed on Oct. 15, 2009.

(51) Int. Cl.
*G06F 17/30* (2006.01)

(52) U.S. Cl.
CPC .................................. *G06F 17/3071* (2013.01)
USPC .......................................... 707/737; 707/738

(58) Field of Classification Search
CPC .................. G06F 17/30598; G06F 17/306025;
G06F 17/30705; G06F 17/30707; G06F 17/3071; G06F 17/30713; G06F 17/30961
See application file for complete search history.

(56) References Cited

U.S. PATENT DOCUMENTS

| | | | |
|---|---|---|---|
| 5,819,258 A * | 10/1998 | Vaithyanathan et al. | 707/692 |
| 5,911,140 A * | 6/1999 | Tukey et al. | 1/1 |
| 6,185,550 B1 | 2/2001 | Snow et al. | |
| 6,233,575 B1 * | 5/2001 | Agrawal et al. | 1/1 |
| 6,349,309 B1 * | 2/2002 | Aggarwal et al. | 1/1 |
| 6,654,739 B1 * | 11/2003 | Apte et al. | 1/1 |
| 6,658,626 B1 * | 12/2003 | Aiken | 715/205 |
| 6,862,586 B1 * | 3/2005 | Kreulen et al. | 1/1 |

(Continued)

FOREIGN PATENT DOCUMENTS

| | | |
|---|---|---|
| EP | 1455285 A2 | 9/2004 |
| EP | 1 486 891 | 12/2004 |

(Continued)

OTHER PUBLICATIONS

"Document Clustering for Electronic Meetings: an Experimental Comparison of Two Techniques," by Roussinov & Chen. In: Decision Support Systems 27 (1999) 67-79. Available at: Sciencedirect.*

(Continued)

*Primary Examiner* — Daniel Kinsaul
(74) *Attorney, Agent, or Firm* — Rowand LLP

(57) ABSTRACT

A document clustering system and method of assigning a document to a cluster of documents containing related content are provided. Each cluster is associated with a cluster summary describing the content of the documents in the cluster. The method comprises: determining, at a document clustering system, whether the document should be grouped with one or more previously created cluster summaries, the previously created cluster summaries being stored in a memory in a B-tree data structure; and if it is determined that the document should not be grouped with the one or more previously created cluster summaries, then creating, at a document clustering system, a cluster summary based on the content of the document and storing the created cluster summary in the B-tree data structure.

34 Claims, 9 Drawing Sheets

(56) References Cited

U.S. PATENT DOCUMENTS

| | | | |
|---|---|---|---|
| 7,568,148 B1* | 7/2009 | Bharat et al. | 715/200 |
| 2003/0101187 A1* | 5/2003 | Gaussier et al. | 707/100 |
| 2003/0169919 A1* | 9/2003 | Ikeda et al. | 382/159 |
| 2003/0217335 A1* | 11/2003 | Chung et al. | 715/514 |
| 2004/0010485 A1* | 1/2004 | Aono et al. | 707/1 |
| 2004/0117340 A1* | 6/2004 | Blitzer | 707/1 |
| 2004/0230577 A1* | 11/2004 | Kawatani | 707/6 |
| 2005/0010555 A1* | 1/2005 | Gallivan | 707/2 |
| 2005/0144193 A1* | 6/2005 | Henzinger | 707/103 R |
| 2006/0000259 A1 | 1/2006 | Handley | |
| 2006/0101102 A1* | 5/2006 | Su et al. | 707/205 |
| 2006/0242190 A1* | 10/2006 | Wnek | 707/102 |
| 2006/0259481 A1 | 11/2006 | Handley | |
| 2007/0005589 A1 | 1/2007 | Gollapudi | |
| 2007/0271265 A1* | 11/2007 | Acharya et al. | 707/6 |
| 2007/0294241 A1* | 12/2007 | Surendran et al. | 707/5 |
| 2008/0183665 A1* | 7/2008 | Brinker et al. | 707/2 |
| 2008/0249999 A1* | 10/2008 | Renders et al. | 707/4 |
| 2009/0070346 A1* | 3/2009 | Savona et al. | 707/100 |
| 2009/0287668 A1* | 11/2009 | Evans et al. | 707/4 |
| 2009/0307213 A1* | 12/2009 | Deng et al. | 707/5 |

FOREIGN PATENT DOCUMENTS

| | | |
|---|---|---|
| EP | 1486891 A2 | 12/2004 |
| JP | 2003271621 | 3/2002 |

OTHER PUBLICATIONS

"Survey of Clustering Data Mining Techniques," by Berkhin, Pavel. In: Grouping Multidimensional Data, by Kogan et al. (1998). Available at http://www8.cs.umu.se/research/ifor/dl/Machine%20learning/Survey%20of%20Clustering%20Data%20Mining%20Techniques.pdf.*

"Exploiting Wikipedia as External Knowledge for Document Clustering," by Hu et al. In: KDD'09, Jul. 1, 2009. Available at: ACM.*

"Centroid-based Summarization of Multiple Documents," by Radev et al. In: Information Processing and Management, 40, pp. 919-938 (2004). Available at: SpringerLink.*

"QCS—A System for Querying, clustering and summarizing documents," by Dunlavy et al. In: Information Processing & Management, vol. 43, is. 6, pp. 1588-1605 (2007). Available at: ScienceDirect.*

"Incremental Document Clustering for Web Page Classification," by Wong & Fu. In: Enabling Society with Information Technology (2002). Available at: SpringerLink.*

"Automatic Labeling of Multinomial Topic Models," by Mei et al. In: KDD'07 (2007). Available at: ACM.*

"Design and Implementation of a Semantic Document Management System," by Wang et al. In: Information Technology J'nl 4(1): 21-31 (2005). Available at: http://citeseerx.ist.psu.edu/viewdoc/download?doi=10.1.1.61.447&rep=rep1&type=pdf.*

"Oracle8i Indexing Choice—Best of Breed," by King, John. In: King Training Resources (2000). Available at: http://www.kingtraining.com/confdownloads/downloads/O8index_slides.pdf.*

Periklis Andritsos, Panayiotis Tsaparas, Reneé J. Miller, and Kenneth C. Severik: "LIMBO: Scalable Clustering of Categorical Data", In Proceedings of the 9th International Conference on Extending Database Technology (EDBT), pp. 123-146, Heraklion, Greece, Mar. 14-18, 2004.

Anil K. Jain, Richard C. Dubes, "Algorithms for Clustering Data", Prentice-Hall, 1988, pp. 55 to 63.

Thomas M. Cover and Joy A. Thomas, "Elements of Information Theory", Wiley & Sons, New York, NY, USA, 1991, pp. 12 to 21.

Noam Slonim and Naftali Tishby, "Agglomerative Information Bottleneck", In NIPS-12, Breckenridge, CO, USA, 1999.

Naftali Tishby, Fernando C. Pereira and William Bialek, "The Information Bottleneck Method", In 37th Annual Alerton Conference on Communication, Control and Computing, Urbana-Champaign, IL, USA, 1999.

"Clustering by Pattern Similarity in Large Data Sets", Online: http://wis.cs.ucla.edu/~hxwang/publications/delta.pdf.

"A framework for flexible clustering of multiple evolving data streams", Online: http://www.inderscience.com/search/index.php?action=record&rec_id=24775.

"Clustering Categorical data streams", Online: http://arxiv.org/ftp/cs/papers/0412/0412058.pdf.

"Cluster Ranking with an application to mining mailbox networks", Online: http://webee.technion.ac.il/people/zivby/papers/mailbox/mailbox.icdm.pdf.

"A Comprehensive overview of Basic Clustering Algorithms", Online: http://pages.cs.wisc.edu/~gfung/clustering.pdf.

International Search Report issued for corresponding PCT Application No. PCT/CA2010/001239.

CIPO, CA Office Action relating to Application No. 2,777,506, dated May 14, 2014.

* cited by examiner

SYSTEM AND METHOD FOR GROUPING MULTIPLE STREAMS OF DATA

CROSS-REFERENCE TO RELATED APPLICATION

This application claims the benefit of and priority to U.S. Provisional Patent Application No. 61/251,813 filed Oct. 15, 2009 under the title SYSTEM AND METHOD FOR GROUPING AND RANKING MULTIPLE STREAMS OF DATA The content of the above patent application is hereby expressly incorporated by reference into the detailed description hereof.

TECHNICAL FIELD

The present disclosure relates generally to document clustering. More specifically, it relates to a method and system for automatically grouping related documents together.

BACKGROUND

In various applications, it may be desirable to group machine readable documents of related content together. For example, news aggregation websites may group related stories together from multiple sources and present such stories in a single location for easy viewing.

As data sources become abundant, the speed of information arrival increases, making the task of grouping documents more difficult.

Thus, there exists a need for improved systems and methods for grouping machine readable documents.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, the present disclosure provides a method of assigning a document to a cluster of documents containing related content. Each cluster is associated with a cluster summary describing the content of the documents in the cluster. The method comprises: determining, at a document clustering system, whether the document should be grouped with one or more previously created cluster summaries, the previously created cluster summaries being stored in a memory in a B-tree data structure; and if it is determined that the document should not be grouped with the one or more previously created cluster summaries, then creating, at a document clustering system, a cluster summary based on the content of the document and storing the created cluster summary in the B-tree data structure.

In a further aspect, the present disclosure provides [a document clustering system for assigning a document to a cluster of documents containing related content. Each cluster is associated with a cluster summary describing the content of the documents in the cluster. The document clustering system includes a memory for storing one or more previously created cluster summaries. The previously created cluster summaries are stored in the memory in a B-tree data structure. The document clustering system further includes one or more processors, configured to: determine whether the document should be grouped with one or more of the previously created cluster summaries; and if it is determined that the document should not be grouped with the one or more previously created cluster summaries, then create a cluster summary based on the content of the document and store the created cluster summary in the B-tree data structure.

Other aspects and features of the present application will become apparent to those ordinarily skilled in the art upon review of the following description of specific embodiments of the application in conjunction with the accompanying figures.

Figure 1:
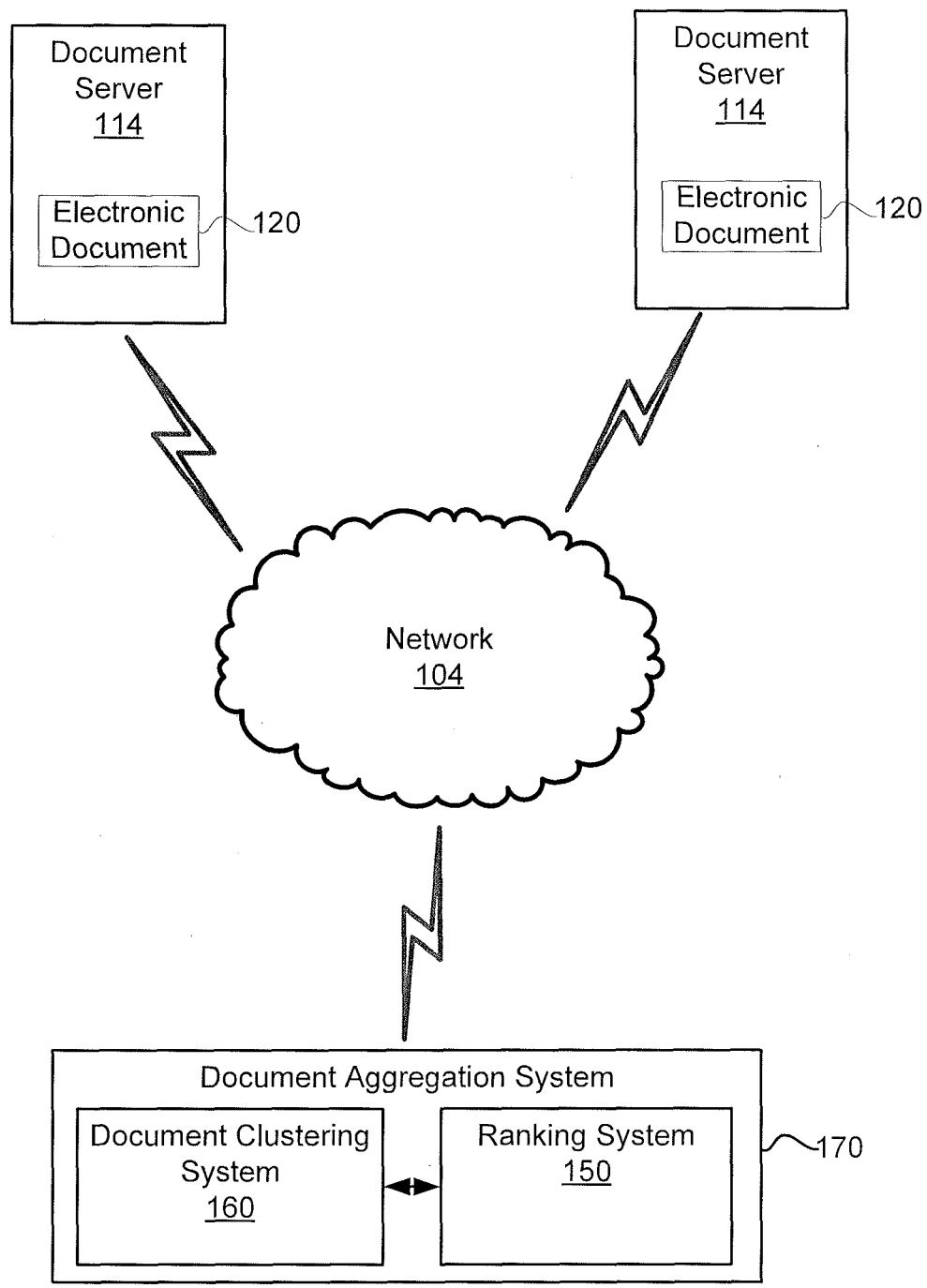
FIG. 1 shows a system diagram illustrating a possible environment in which embodiments of the present application may operate.

Reference is first made to FIG. 1, which illustrates a system diagram of a possible operating environment in which embodiments of the present disclosure may operate.

In the embodiment of FIG. 1, a document clustering system 160 and a ranking system 150 are illustrated. The document clustering system 160 is configured to receive machine readable documents, such as electronic documents 120, and to analyze such documents in order to group documents which include related content.

That is, the document clustering system 160 automatically analyzes electronic documents 120 to determine whether such documents include related subject matter and creates groups (which may also be referred to as clusters) of documents containing related subject matter. The groups (or clusters) may be associated with one or more cluster summary, which each identify the contents of an associated group (or cluster).

The electronic documents 120 may, in various embodiments, be one or more of: blogs, micro-blogs such as Twitter™, on-line news sources, user-generated comments from web-pages, etc. Other types of electronic documents 120 are also possible. By way of example and not limitation, the documents 120 may be formatted in a Hyper-Text Markup Language ("HTML") format, a plain-text format, a portable document format ("PDF"), or in any other format which is capable of representing text or other content. Other document formats are also possible.

The electronic documents 120 may be located on a plurality of document servers 114, which may be accessible through a network 104, such as the Internet. In some embodiments, the document servers 114 may be publicly and/or privately accessible web-sites which may be identified by a unique Uniform Resource Locator ("URL").

The network 104 may be a public or private network, or a combination thereof. The network 104 may be comprised of a Wireless Wide Area Network (WWAN), A Wireless Local Area Network (WLAN), the Internet, a Local Area Network (LAN), or any combination of these network types. Other types of networks are also possible and are contemplated by the present disclosure.

After the document clustering system 160 clusters documents, the ranking system 150 may be configured to rank documents 120 within a group (or cluster) of documents based on predetermined criteria. The ranking system 150 may also be configured to rank clusters of documents. That is, the document ranking system 150 may be configured to assign a rank to a document within a group to indicate the importance of the document relative to other documents of that group. The ranking system 150 may also be configured to assign a rank to a group of documents to indicate the importance of the group of documents relative to other groups of documents. The rank may be a score, such as a numerical value, which is assigned to the group or document.

The ranking system 150 and the document clustering system 160 may, in various embodiments, be separate systems. In other embodiments, the ranking system 150 and the document clustering system 160 may be combined in a single system which is configured to provide the functionality of both the document clustering system 160 and the ranking system 150. The combined system may in some embodiments be referred to as a document aggregation system 170. The combined system may also, in various embodiments, be referred to as a document clustering system 160 (which is a system which provides for document clustering but which may also, in various embodiments, provide for other functionality; such as document ranking), or a ranking system 150 (which is a system which provides for document and/or group ranking but which may also, in various embodiments, provide for other functionality; such as document clustering).

Accordingly, the document aggregation system 170, the document clustering system 160 and/or the ranking system 150 may include functionality in addition to the ability to group documents and/or rank documents or groups of documents. For example, the document aggregation system 170, the document clustering system 160 and/or the ranking system 150 may, in various embodiments, include a document search system, which is configured to search for and locate electronic documents 120 available on document servers 114 which are accessible through the network 104.

The document aggregation system 170, the document clustering system 160 and/or the ranking system 150 may, in various embodiments, also include a document cleaning system, which is configured to analyze documents 120 and manipulate such documents in a manner which renders the documents 120 more suitable for use in other systems. For example, a document cleaning system may clean up electronic documents 120 to remove erroneous phrases or other unwanted information before such documents are analyzed by the document clustering system 160. That is, cleaned documents may be produced which include less text than the original electronic documents 120. The document cleaning system may clean original electronic documents 120 in order to remove unwanted or bad text and produce cleaned documents which are based on the original electronic documents 120 but which do not contain the unwanted or bad text.

The document aggregation system 170, the document clustering system 160 and/or the ranking system 150 may, in various embodiments, also include a web-interface subsystem for automatically generating web pages which permit the accessing of the documents 120 on the document servers 114 and/or provide other information about the documents 120. The other information may include a machine-generated summary of the contents of the document 120, and a rank of the subject matter of the document 120 as determined by the ranking system 150. The web pages which are generated by the web-interface subsystem may display documents 120 in groups (clusters) determined by the document clustering system 160.

The document aggregation system 170, the document clustering system 160 and/or the ranking system 150 include a power subsystem for providing electrical power to electrical components of the document aggregation system 150 and a communication subsystem for communicating with the document servers 114 through the network 104.

It will be appreciated that the document aggregation system 170, the document clustering system 160 and/or the ranking system 150 may, in various embodiments, include more or less subsystems and/or functions than are discussed herein. It will also be appreciated that the functions provided by any set of systems or subsystems may be provided by a single system and that these functions are not, necessarily, logically or physically separated into different subsystems.

The electronic documents 120 may, in some embodiments, be news-related documents which contain information about recent and important events. In such cases, the document aggregation system 170 may also be referred to as a news aggregation system. The news aggregation system may be configured to locate and group electronic documents 120 which are related to a common event or story.

Furthermore, while FIG. 1 illustrates one possible embodiment in which the document clustering system 160 may operate, it will be appreciated that the document clustering system 160 may be employed in any system in which it may be useful to employ a machine in order to cluster (or group) machine readable documents (such as the electronic documents 120).

Accordingly, the term document clustering system 160, as used herein, is intended to include stand alone document clustering systems which are not, necessarily, part of a larger system, and also document clustering sub-systems which are part of a larger system (which may be the same or different than the document aggregation system 170 of FIG. 1). The term document clustering system 160 is, therefore, intended to include any systems in which the document clustering methods described herein are included.

Furthermore, while FIG. 1 illustrates one possible embodiment in which the ranking system 150 may operate, it will be appreciated that the ranking system 150 may be employed in any system in which it may be useful to employ a machine to rank machine readable documents (such as the electronic documents 120) or groups of such documents.

Accordingly, the ranking system 150, as used herein, is intended to include stand alone ranking systems which are not, necessarily, part of a larger system, and also ranking sub-systems which are part of a larger system (which may be the same or different than the document aggregation system 170 of FIG. 1). The term ranking system 150 is, therefore, intended to include any systems in which the ranking methods described herein are included.

Figure 2:
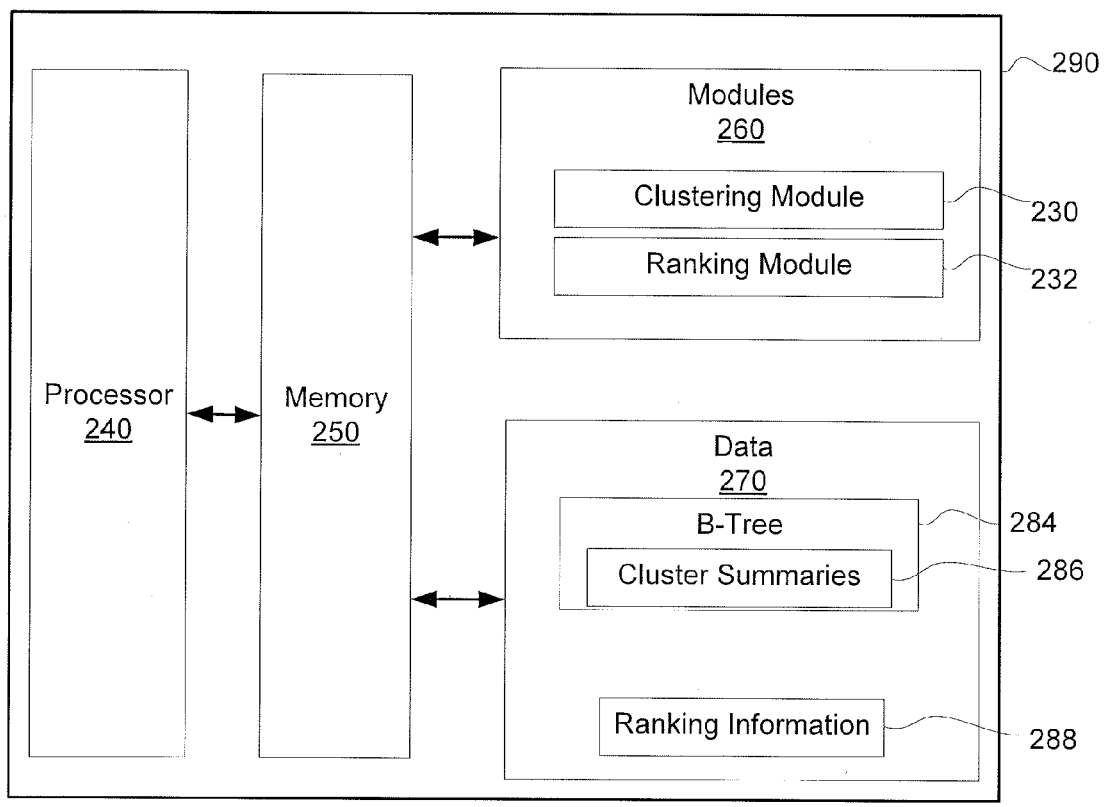
FIG. 2 shows a block diagram of a system in accordance with an embodiment of the present disclosure.

In at least some embodiments, the document clustering system 160, the ranking system 150 and/or the document aggregation system 170 may be implemented, in whole or in part, by way of a processor 240 which is configured to execute software modules 260 stored in memory 250. A block diagram of one such system is illustrated in FIG. 2. In the discussion of FIG. 2, the document clustering system 160, the ranking system 150 and/or the document aggregation system 170, as the case may be, is referred to simply as the system

290. Depending on the functionality provided by the specific embodiment, the system 290 may be any one or more of the document clustering system 160, the ranking system 150 and/or the document aggregation system 170 of FIG. 1.

In the embodiment of FIG. 2, the system 290 includes a controller comprising one or more processor 240 which controls the overall operation of the system 290. The system 290 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 240 may operate under stored program control and may execute software modules 260 stored on the memory 250. Where the system 290 is a document clustering system, the modules 260 may include a clustering module 230, which is configured to group electronic documents 120 together based on the contents of such documents. That is, the clustering module 230 is configured to group documents in order to create clusters of documents having related content.

Where the system 290 is a ranking system, the modules 260 may include a ranking module 232. The ranking module 232 may be configured to rank documents 120 within a group (or cluster) of documents based on predetermined criteria. The ranking module 232 may also be configured to rank clusters of documents. That is, the ranking module 232 may be configured to assign a rank to a document within a group to indicate the importance of the document relative to other documents of that group. The ranking module 232 may also be configured to assign a rank to a group of documents to indicate the importance of the group of documents relative to other groups of documents. The rank may be a score, such as a numerical value, which is assigned to the group or document.

The memory 250 may also store data 270, which may include a B-tree 284 containing cluster summaries 286. The system 290 receives a machine readable document, such as the electronic documents 120 (FIG. 1), as an input and determines whether the document 120 may be assigned to a cluster of documents. The system 290 creates summaries of clusters of documents. That is, each cluster of documents may have a cluster summary 286, stored in memory 250, which is associated with that cluster. The cluster summary 286 may summarize the contents of the documents associated with that cluster.

The memory 250 may also store other data 270 such as, for example ranking information 288 (such as a rank) associated with documents and/or clusters. The ranking information 288 may be generated by the ranking module 232 according to the methods discussed below with reference to FIG. 8 and/or FIG. 9.

Specific functions which may be provided by the clustering module 230 will be discussed below in greater detail with respect to FIGS. 4 to 7. Specific function which may be provided by the ranking module 232 will be discussed below in greater detail with respect to FIGS. 8 and 9.

It will be appreciated that the system 290 may be comprised of other features, components, or subsystems apart from those specifically discussed herein. By way of example and not limitation, the system 290 will include a power subsystem which interfaces with a power source, for providing electrical power to the system 290 and its components. By way of further example, the system 290 may include a display subsystem for interfacing with a display, such as a computer monitor and, in at least some embodiments, an input subsystem for interfacing with an input device. The input device may, for example, include an alphanumeric input device, such as a computer keyboard and/or a navigational input device, such as a mouse.

It will also be appreciated that the modules 260 may be logically or physically organized in a manner that is different from the manner illustrated in FIG. 2. By way of example, in some embodiments, the clustering module 230 and the ranking module 232 may be included in a single software module.

Figure 3:
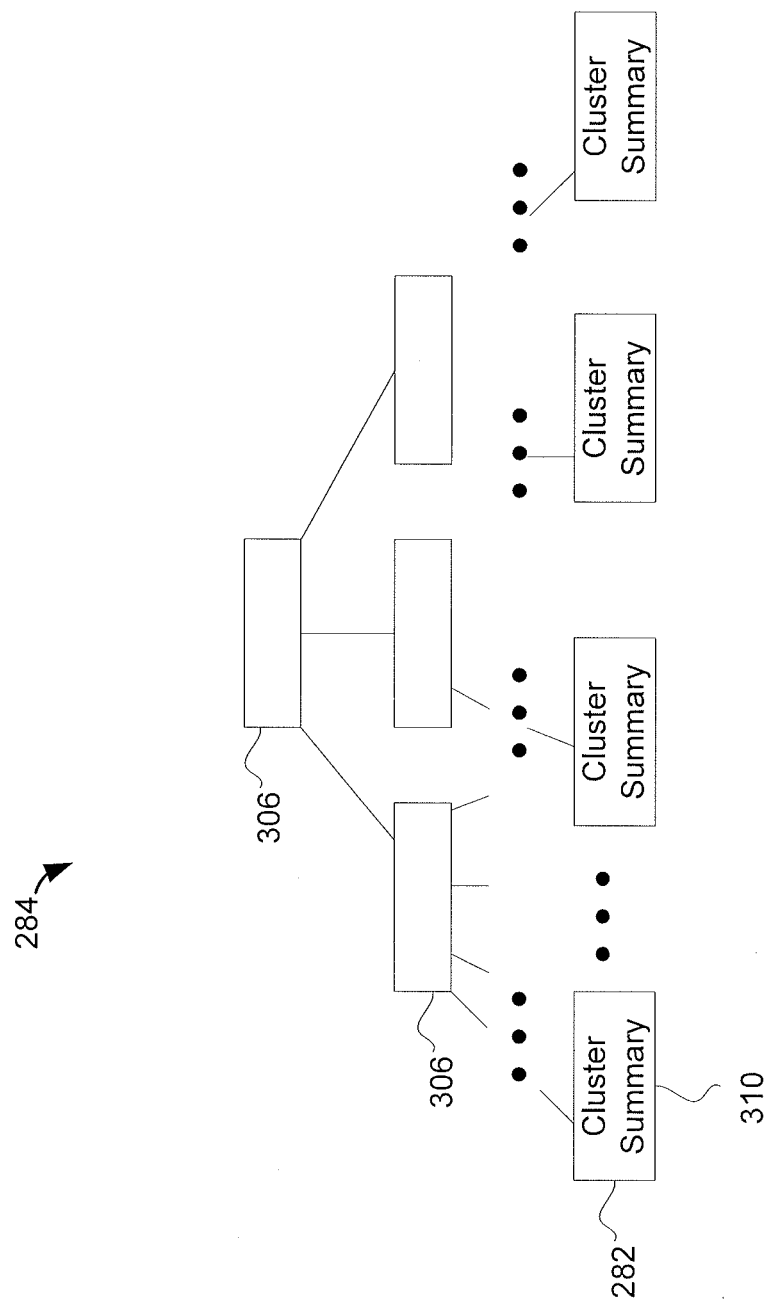
FIG. 3 shows an example of a B-tree storing cluster summaries in accordance with an embodiment of the present disclosure.

Referring now to FIG. 3, an example of a B-tree 284 data structure which may be used for storing cluster summaries 282 is illustrated. The B-tree 284 includes leaf nodes 310 which store the cluster summaries 282. The B-tree 284 also include internal nodes 306 which may be used to store data which represents, at a higher level, the data contained in the leaf nodes 310. That is, any parent node (such as the internal nodes 306) represents data which is contained in a child node (such as the cluster summary 310). By way of example, a parent node having two child nodes may identify that documents contained in the child nodes relate to a common subject (i.e. it may indicate that the documents in the child nodes relate to "Obama"), the child nodes, however, may further specify the contents of the document in greater detail (i.e. one child of the parent node may specify that the documents contained in that child relate to "Michelle Obama", while another child of the parent node may specify that the documents contained in that child relate to "Barack Obama.")

Figure 4:
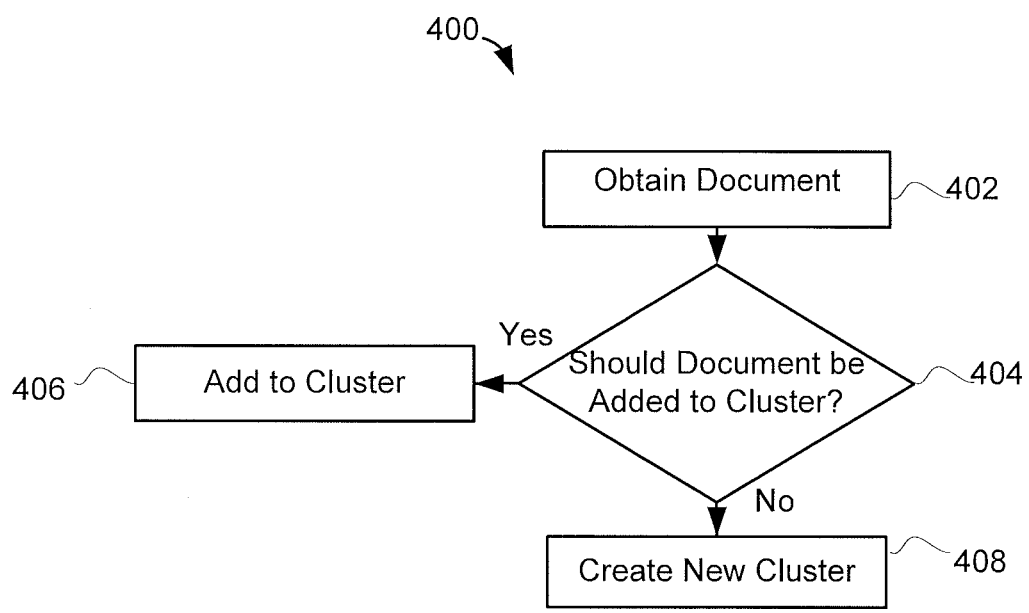
FIG. 4 is a flowchart of a process for clustering documents in accordance with an embodiment of the present disclosure.

Referring now to FIG. 4, a process 400 for clustering documents is illustrated. In the process 400 of FIG. 4, one or more electronic documents 120 may be assigned to a cluster of documents containing related content. Each cluster of documents is associated with a cluster summary which describes the content of the documents associated with the cluster.

The process 400 includes steps or operations which may be performed by the document clustering system 160. More particularly, the clustering module 230 may be configured to perform the process 400 of FIG. 4. That is, the clustering module 230 may contain instructions for causing the processor 240 to execute the process 400 of FIG. 4.

At step 402, the document clustering system 160 obtains an electronic document 120. The electronic document 120 may be retrieved, by the document clustering system 160, from a remote server, such as the document servers 114 of FIG. 1. The remote document server 114 may be accessible via a network 104, such as the Internet. In other embodiments, the electronic document 120 may be retrieved from a memory associated with the document clustering system 160, such as the memory 250 of FIG. 2.

Next, at step 404, the document clustering system 160 determines whether the electronic document 120 should be grouped with an existing cluster of documents. The existing cluster of documents has a previously created cluster summary which is associated with that cluster. The cluster summary summarizes features of the documents associated with that cluster. For example, the cluster summary may summarize the contents of the documents in that cluster. The cluster summary may also include timestamp information associated with one or more documents in the associated cluster. For example, the cluster summary may include a timestamp associated with a newest document in the cluster. Similarly, the cluster summary may include a timestamp associated with the oldest document in the cluster.

The document clustering system 160 may determine whether the electronic document 120 should be grouped with an existing cluster by comparing features of the electronic document 120 with the cluster summary for each cluster. The features of the electronic document 120 which are compared with the cluster summary may include the contents of the electronic document 120. That is, the contents of the electronic document 120 may be compared with a cluster summary. When comparing the features of the electronic document 120 to each cluster summary, the document clustering system 160 may select one of the cluster summaries as the closest, or most representative cluster summary for the electronic document 120. That is, the document clustering system 160 may determine which of the cluster summaries is most representative of the document.

The document clustering system 160 may then determine whether the contents of the electronic document 120 is sufficiently similar to the closest cluster summary. If the document clustering system 160 determines that the contents of the electronic document 120 is not sufficiently similar to the closest cluster summary, then the document clustering system 160 may determine that the document should not be added to any clusters. Alternatively, if the document clustering system 160 determines that the contents of the electronic document 120 are sufficiently similar to the closest cluster summary, then the document clustering system 160 may determine that the document should be added to the cluster associated with that cluster summary.

The cluster summaries may be stored in a memory 250 associated with the system 290. In at least some embodiments, the cluster summaries are stored in memory 250 a B-tree data structure of the type illustrated in FIG. 3. In at least some embodiments, the cluster summaries are stored in leaves of the B-tree data structure.

A B-tree data structure is a tree data structure that allows for rapid retrieval of data contained in the data structure.

If, at step 404, the document clustering system 160 determines that the document should be added to a cluster, then at step 406, the document is added to that cluster. Adding the document to the cluster may include updating the cluster summary associated with that cluster based on features of that document 120. Adding the document to the cluster may also include associating, in memory 250 of the document clustering system 160, the document 120 with the closest cluster summary. That is, the memory may be updated so that the cluster summary which was identified as the closest to the document has a link or other identifier which indicates that the document obtained at step 402 is now considered to be included in the cluster associated with that cluster summary.

Alternatively, if at step 404, the document clustering system 160 determines that the document should not be added to a cluster, then at step 408, a new cluster summary is created based on the document 120.

It will be appreciated that, in at least some embodiments, at step 404, the document clustering system 160 may not yet have access to clusters and/or cluster summaries. For example, at a time of first use of the document clustering system 160, there may not be any cluster summaries associated with the document clustering system. In such cases, the document clustering system 160 may create a new cluster based on the first document 120 which is analyzed by the document clustering system 160, in the manner discussed with reference to step 408.

While FIG. 4 illustrates an example in which the clustering process 400 is applied to a single electronic document 120, in operation, the clustering process 400 may be repeated for a plurality of electronic documents 120. For example, in at least some embodiments, the document clustering system retrieves a plurality of documents 120 from a plurality of input streams. The plurality of documents may be temporarily (or in some embodiments permanently) stored in a queue in memory until a pre-defined number of electronic documents 120 have accumulated. Once the predefined number of electronic documents 120 has accumulated and/or a predefined time interval has expired, the process 400 may be performed on each of those electronic documents 120. The electronic documents 120 which have accumulated may be referred to as a batch.

Figure 5:
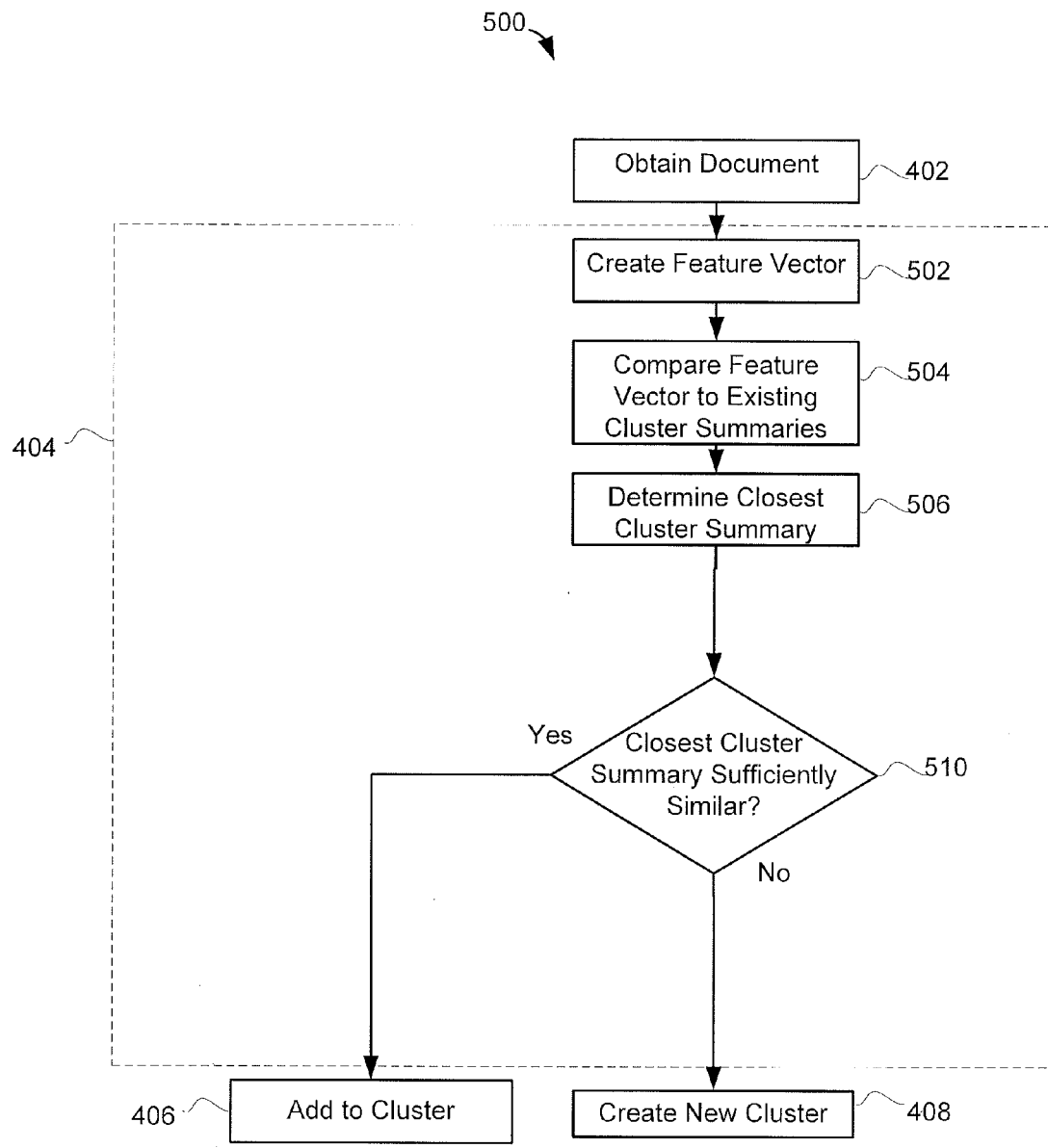
FIG. 5 is a flowchart of a process for clustering documents in accordance with an embodiment of the present disclosure.

Referring now to FIG. 5, a process 500 for clustering documents is illustrated. As in the process 400 of FIG. 4, in the process 500 of FIG. 5, one or more electronic documents 120 may be assigned to a cluster of documents containing related content. Each cluster of documents is associated with a cluster summary which describes the content of the documents associated with the cluster.

The process 500 includes steps or operations which may be performed by the document clustering system 160. More particularly, the clustering module 230 may be configured to perform the process 500 of FIG. 5. That is, the clustering module 230 may contain instructions for causing the processor 240 to execute the process 500 of FIG. 5.

At step 402, the document clustering system 160 obtains an electronic document 120. The electronic document 120 may be retrieved, by the document clustering system 160, from a remote server, such as the document servers 114 of FIG. 1. The remote document server 114 may be accessible via a network 104, such as the Internet. In other embodiments, the electronic document 120 may be retrieved from a memory associated with the document clustering system 160, such as the memory 250 of FIG. 2.

Next, at step 404, the document clustering system 160 determines whether the electronic document 120 obtained at step 402 should be grouped with an existing cluster of documents. Step 404 includes a number of additional sub-steps which may be performed by the document clustering system 160 to determine whether the electronic document 120 should be grouped with an existing cluster.

At step 502, the document clustering system 160 creates a feature vector based on the document. The feature vector describes the document using a set of features which are each associated with a value which may numerically represent the features. Features may, in various embodiments, relate to any one or more of the following: the presence or absence of specific data tokens, measurements carried out over the document, statistics of the content of the document, and/or metadata such as the source location of the document (such as a Uniform Resource Locator (URL) or other identifier associated with the document server 114), or a timestamp associated with the document 120. The timestamp may, in some embodiments, indicate the time at which the document 120 was obtained by the document clustering system 160 from the document server 114.

By way of example, a feature vector associated with a document that is a news article or other text-based document, may include the set of words which are included in the article, or a representative set of the words included in the article. The representative set of words may be obtained by applying a suitable natural language processing technique to the document 120.

The feature vector may also include a value associated with each word in the feature vector which identifies the frequency of occurrence of that word in the document.

For example, the following feature vector, FV, may be used to describe the fact that document D includes keywords "blue", "bird" and "walking" with frequencies of 1, 3, and 2 respectively:

$$FV=\{blue:1, bird:3, walking:2\}$$

In some embodiments, the feature vector may include a timestamp which is associated with the document. The timestamp may, in some embodiments, indicate the date and/or time at which the document 120 was retrieved from a remote document server 114. The timestamp may, in other embodiments, indicate a date and/or time at which the document 120 was authored. For example, where the document 120 is a news article, the timestamp may indicate a date and/or time included in the content of the document which indicates the date and/or time when the document was written or published.

For example, the following feature vector, FV, may be used in embodiments in which a feature vector includes a timestamp, $t_p$, associated with the document, D:

$$FV=\{blue:1, bird:3, walking:2, t_D\}$$

Next, at step 504, the feature vector, FV, is compared with existing cluster summaries. This comparison may be performed by determining a measure of similarities between the feature vector and the cluster summary. As will be described in greater detail below, the measure of similarities is, in at least some embodiments, an information loss or distance between the feature vector and the cluster summary.

In the following discussion, a cluster summary may be denoted by CS(S), where S is the set of documents that it summarizes. As will be explained in greater detail below, the cluster summary includes an aggregated feature vector that describes all objects in S. The cluster summary may, in some embodiments, include a value which identifies the number of documents that CS(S) summarizes. In some embodiments, the cluster summary may identify words contained in the documents of the set of documents which are summarized by the cluster summary, together with a value identifying their total frequency of use in all documents summarized by the cluster summary.

The cluster summary may also include one or more timestamp related to the documents summarized by the cluster summary. The timestamp may, in some embodiments, identify the oldest document summarized by the cluster summary. In some embodiments, the timestamp may identify the most recent document summarized by the cluster summary.

In other words, given a collection of documents $S=(S_1, S_2, \ldots S_n)$, which are each represented by a feature vector as described above with reference to step 502, then the cluster summary CS(S) may be given by:

$$CS(S)=\{n(S), f_1:v_1, f_2:v_2, \ldots f_n:v_n, T_S, T_E\},$$

where:
S is the cluster of documents;
n(S) is the number of documents that CS(S) summarizes;
$f_i$ is the i-th feature and $v_i$ is the sum of its values in S (i.e. the sum of its values in all documents summarized by the cluster summary CS(S));
$T_s$ is the first timestamp of the cluster S, which may be defined as the timestamp of its oldest document (i.e. $T_s=\min\{t_{s1}, t_{s2}, \ldots t_{sn}\}$);
$T_E$ is the last timestamp of the cluster S, which may be defined as the timestamp of its most recent document (i.e. $T_E=\max\{t_{s1}, t_{s2}, \ldots t_{sn}\}$).

Accordingly, at step 504, a feature vector for a document may be compared with existing summaries in order to calculate the distance of a feature vector from a cluster summary. The distance of a feature vector to a cluster summary may be defined as the information loss that would occur if the feature vector were added to the cluster summary. That is, the comparison at step 504 may determine the information loss that would occur if the document, D, associated with the feature vector, FV, were added to the cluster, S, associated with the cluster summary CS(S).

Information loss may, in some embodiments, be measured using a weighted Jensen-Shannon divergence. Given two vectors, $C_x$ and $C_y$, their information loss may be defined as:

$$IL(C_x,C_y)=[p(C_x)+p(C_y)]D_{JS}[p(f_i|C_x),p(f_j|C_y)]$$

where:
$p(C_x), p(C_y)$ are the probabilities of appearance of $C_x$ and $C_y$ and are defined as the number of documents in $C_x$, $C_y$ respectively, over the total number of documents seen so far.
$p(f_i|C_x), p(f_j|C_y)$ are the probability distributions of the features in the set $F=\{f_1, f_2, \ldots f_q\}$ inside clusters $C_x$ and $C_y$ respectively,
$D_{JS}$ is the Jensen-Shannon (JS) divergence.

By applying the above expression, the information loss between a document, D, and a cluster summary $CS(S_j)$ of a cluster $S_j$ can be computed as:

$$IL(FV,CS(S_j))=(1/N+|S_j|/N)D_{JS}[p(F|FV),p(F|CS(S_j))]$$

where:
N is the total number of documents seen so far, 1/N and $|S_j|/N$ are the probabilities of appearances of the feature vector and the cluster summary respectively and are defined as the total number of documents in the feature vector and the cluster summary respectively over the total number of documents seen so far. With respect to the total number of documents in the feature vector, there is only one document in the feature vector. With respect to the total number of documents in the cluster summary, there are $|S_j|$ documents in the cluster summary. $p(F|FV), p(F|CS(S_j))$ are the probability distributions of the features in the set $F=\{f_1, f_2, \ldots f_q\}$ inside feature vector and cluster summary respectively,
and $D_{JS}$ is the Jensen-Shannon (JS) divergence.

Accordingly, in at least some embodiments, at step 504, the feature vector is compared to existing cluster summaries in order to determine the information loss that would be incurred if the feature vector were to be added to each of the existing cluster summaries.

Next, at step 506, the document clustering system 160 determines a closest cluster summary to the feature vector. That is, based on the result of the comparison at step 504, the feature vector identifies the cluster summary having the lowest information loss which would be incurred if the feature vector were added to that cluster summary. The cluster summary with the smallest distance to the feature vector, FV, may be referred to as $CS(S_{min})$.

Next, at step 510, the document clustering system 160 compares the distance, or information loss, between the feature vector and the closest cluster summary with a predetermined threshold in order to determine whether the cluster summary is sufficiently similar to the feature vector. In at least some embodiments, if the information loss between the feature vector and the closest cluster summary exceeds the predetermined threshold, then the document clustering system 160 determines that the cluster summary is not sufficiently similar to the feature vector. In such a case, the document clustering system 160 proceeds to step 408 where a new cluster is created. The new cluster may be created by creating a cluster summary for the document based on the feature vector for that document. In at least some embodiments, the cluster summary for the document may be created by saving the feature vector as a cluster summary. That is, the feature vector may be converted into the new cluster summary. The new cluster summary may be saved in a memory 250 associated with the document clustering system 160 in a B-tree data structure. The new cluster summary may be saved in a leaf node of the B-tree. Creating a new cluster may include a step of associating, in memory 250 of the document clustering system 160, the document 120 with the new cluster summary.

Alternatively, if the information loss between the feature vector and the closest cluster summary does not exceed the predetermined threshold (as determined at step 510), then the document clustering system 160 determines that the cluster summary is sufficiently similar to the feature vector. In such a case, at step 406, the document clustering system 160 adds the document to the cluster of documents associated with the closest cluster summary. Adding the document to the cluster may include updating the cluster summary associated with that cluster based on features of that document 120. For example, in at least some embodiments, the closest cluster summary, $CS(S_{min})$ may be replaced by a new cluster summary which includes the features includes in the closest cluster summary and also the features of the feature vector associated with the document.

Adding the document to the cluster may also include associating, in memory 250 of the document clustering system 160, the document 120 with the closest cluster summary. That is, the document D or a reference to the document D, may be added to the set of documents, S, associated with the closest cluster summary.

Figure 6:
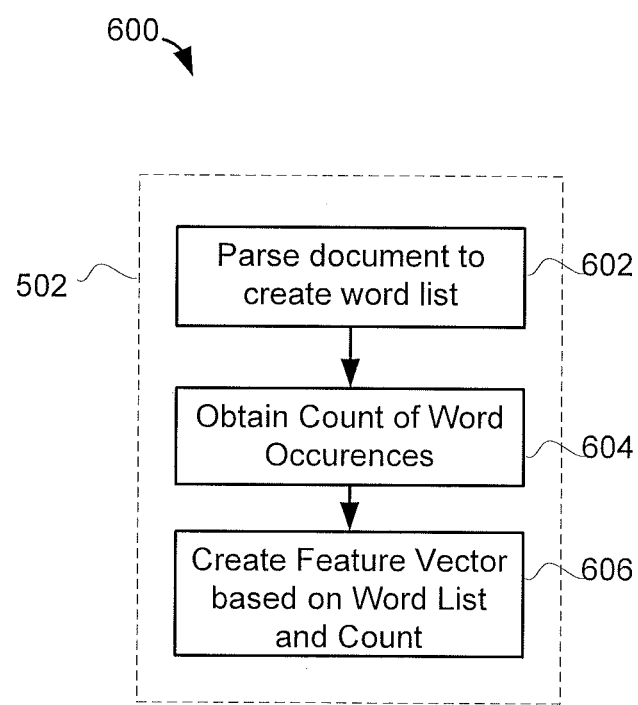
FIG. 6 shows a flowchart of a process for creating a feature vector in accordance with an embodiment of the present disclosure.

Referring now to FIG. 6, an embodiment of a process 600 for creating feature vectors is illustrated in a flowchart. The process 600 may be included in the step 502 of the process 500 of FIG. 5.

The process 600 includes steps or operations which may be performed by the document clustering system 160. More particularly, the clustering module 230 may be configured to perform the process 600 of FIG. 6. That is, the clustering module 230 may contain instructions for causing the processor 240 to execute the process 600 of FIG. 6.

As noted previously, a feature vector describes a document using a set of features which are each associated with a value which may numerically represent the features. In the embodiment of FIG. 6, the feature vector describes a document in terms of the frequency of occurrence of words in that document. The process 600 of FIG. 6 may be used with text-based documents.

First, at step 602, the document clustering system 160 parses the document to create a word list based on the document. The word list identifies words used in the document.

Next, at step 604, the document clustering system 160 obtains a count of the occurrence of each word in the word list.

Next, at step 606, the document clustering system 160 creates a feature vector based on the word list and count. The feature vector may, in some embodiments, list each word used in the document together with a count which indicates the frequency of use of the word in the document.

It will be appreciated that, in various embodiments, the feature vector may include features in addition to counts associated with word occurrences. As discussed above with reference to FIG. 5, the other features may include, for example, one or more timestamp associated with the document.

It will also be appreciated that, in some embodiments, words which are included in the document may not be included or represented in the feature vector. For example, some embodiments may include a filtering step in which one or more words included in the document are filtered out. The filtering step may, in some embodiments, remove words that are used infrequently. Other methods of filtering may also be used.

In at least some embodiments, after one or more documents are added to clusters (for example, according to the processes 400, 500 of FIGS. 4 and 5), the document clustering system 160 and/or the ranking system 150 may perform further post-processing steps on the clusters and/or the cluster summaries.

For example, in some embodiments, after documents are assigned to clusters, cluster cleanup methods may be employed in order to produce more valuable clusters.

Figure 7:
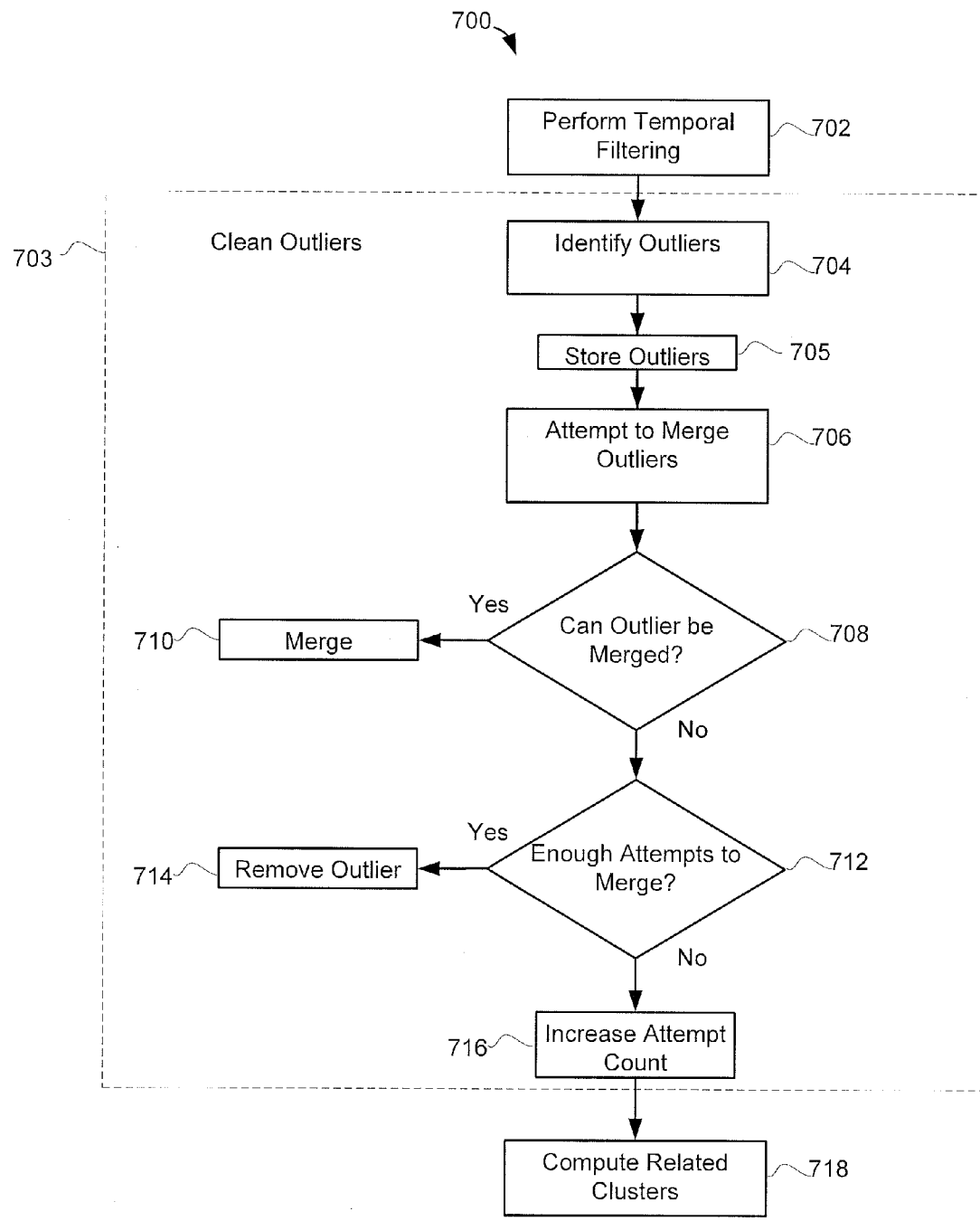
FIG. 7 is a flowchart of a process for cleaning clusters in accordance with an embodiment of the present disclosure.

Referring now to FIG. 7, a process 700 for cleaning clusters is illustrated. The process 700 may, in some embodiments, be performed after each iteration of the process 400 or 500 of FIGS. 4 and 5 respectively. That is, in some embodiments, each time a document 120 is included in a cluster using the process 400 or 500 of FIG. 4 or 5, the process 700 may be performed. In other embodiments, the process 700 may be performed after the clustering process 400, 500 of FIG. 4 or 5 has been performed on a batch of documents. For example, in some embodiments, the process 700 may be performed after a predetermined number of iterations of the clustering process 400, 500 of FIG. 4 or 5. In some embodiments, the process 700 may be performed at predetermined time intervals. For example, in some embodiments, the process 700 may be performed each day.

The process 700 includes steps or operations which may be performed by the document clustering system 160. More particularly, the clustering module 230 may be configured to perform the process 700 of FIG. 7. That is, the clustering module 230 may contain instructions for causing the processor 240 to execute the process 700 of FIG. 7.

The process includes three cleaning stages. First, at step 702, the document clustering system 160 performs temporal filtering on the cluster summaries. That is, the document clustering system 160 may remove cluster summaries for clusters of documents in which the most recent document in that cluster is determined to be too old. This determination may be made by comparing the elapsed time between a current time and the timestamp of the most recent document with a predetermined threshold. If the elapsed time exceeds the predetermined threshold, then the cluster summary may be determined to be too old. In such cases, the cluster summary may be removed from memory. That is, the cluster summary may be removed from the B-tree.

The timestamp which is used in step 702 may indicate the date and/or time at which the document 120 associated with that timestamp was received at the document clustering system. In other embodiments, the timestamp may indicate the date and/or time at which the document 120 was authored or published.

Next, at step 703, the document clustering system cleans outliers from the cluster summaries. The step 703 may include a number of sub-steps. First, at step 704, the document clustering system 160 attempts to identify outliers. Outliers represent deviations in the clusters. Outliers may include, for example, cluster summaries which summarize single documents. Outliers may also include, for example, cluster summaries of identical documents (i.e. duplicates).

At step 703, in some embodiments, all cluster summaries in leaf nodes of a B-tree are examined in a serial manner to assess whether the cluster summaries represent either a single document or multiple identical documents.

The outliers may be stored in a suitable data structure in the memory 250 at step 705.

At some time later, the document clustering system 160 may attempt to merge the outliers into other cluster summaries (step 706). In some embodiments, this is done by calculating the distance or information loss between the outliers and the cluster summaries of the B-tree leaf nodes. The distance or information loss between the outliers and the cluster summaries may be determined in the manner described with reference to FIG. 5.

Next, at step 708, the document clustering system 160 determines whether the outlier may be merged with another cluster summary. It may do so by determining the closest cluster summary to the outlier in the manner described above with reference to step 506 of FIG. 5. If the information loss which would occur as a result of the outlier being merged with the closest cluster summary would be less than a predetermined threshold, then the outlier may be merged with the cluster summary (step 710). When the outlier is merged with the cluster summary a new cluster summary may be created based on the outlier and closest cluster summary.

If the information loss which would occur as a result of the outlier being merged with the closest cluster summary exceeds the predetermined threshold, then the process may proceed to step 712. In some embodiments, at step 712, a determination may be made regarding whether the document clustering system 160 has made sufficient attempts to merge the outlier. This determination may be made by comparing a merge attempt count with a predetermined threshold. The merge attempt count may track the number of attempts at merging a given outlier that the document clustering system 160 has made. That is, the merge attempt count may track the number of times step 706 has been performed for a given outlier.

If the merge attempt count exceeds the predetermined threshold, then the outlier may be removed from the B-tree (step 714). Otherwise, the merge attempt count may be incremented (step 716).

Following the step 703 of cleaning outliers, at step 718, a computation of related clusters may be performed. It will be appreciated that, in some cases, the clustering processes 400 and 500 of FIGS. 4 and 5 will result in cluster summaries which are highly related but which did not get merged. For example, one cluster summary may summarize news stories which are related to a men's tennis tournament and another cluster summary may summarize news stories which are related to a women's tennis tournament.

At step 718, the overlap between cluster summaries may be determined. In some embodiments, the cluster overlap, CO, between two clusters $C_1$ and $C_2$, may be calculated as:

$$CO(C_1, C_2) = |F_1 \cap F_2| / |F_1 \cup F_2|,$$

where F1 and F2 are the sets of features in the cluster summaries of $C_1$ and $C_2$.

It will, however, be appreciated that the cluster overlap or similarity between two cluster summaries may be calculated in other ways.

In at least some embodiments, as an additional safeguard, the overlap of the frequency of the occurrence of features in the cluster summaries is also considered. That is, in some embodiments, at step 718, the document clustering system 160 considers the frequency of the features of the two clusters (rather than simply the existence of the features) in order to determine whether the cluster summaries are related.

The overlap of two clusters (or another measure of the similarity of the clusters) may be compared with one or more predetermined thresholds in order to determine whether the clusters are sufficiently related.

In at least some embodiments, if the cluster summaries are determined to be related, the cluster summaries are merged.

It will be appreciated that, while FIG. 7 illustrates a process 700 of cleaning which includes temporal filtering (step 702), a step 703 of cleaning outliers and a step 718 of computing related clusters, in other embodiments, one or more of these steps may be omitted. Furthermore, it will be appreciated that the order of the steps 702, 703, 718 may be varied. It will also be appreciated that, in some embodiments, additional cleanup steps may be performed. For example, in at least one embodiment, clusters may periodically be removed if they contain fewer than a specified number of documents. Similarly, in some embodiments, clusters may periodically be removed if they contain documents of low quality. That is, clusters which have a quality score which is less than a predetermined threshold may be removed. Methods of determining a quality score of the cluster are discussed below with reference to step 906 of FIG. 9.

In at least some embodiments, the methods and systems described herein may be used with a web-interface system or subsystem, which may be referred to as a web-based aggregator. The web-based aggregator may be configured to automatically generate web-pages which provide an interface for accessing documents 120. For example, links may be provided to documents 120 which have been analyzed by the document clustering system 160. The links or other content may be presented, at least in part, based on the clusters recognized by the document clustering system 160. For example, links to a plurality of related documents may be provided on a common page or interface.

In some embodiments, the volume of documents which are accessible via the web-based aggregator or which are analyzed by the document clustering system may be large. In such embodiments, it may be desirable to rank documents and/or clusters of documents and to generate web-pages which provide access to the documents based on the rank. For example, higher ranked clusters may be displayed more prominently on web-pages than lower ranked clusters. Similarly, higher ranked documents within a cluster may be displayed more prominently than lower ranked documents within the same cluster.

Figure 8:
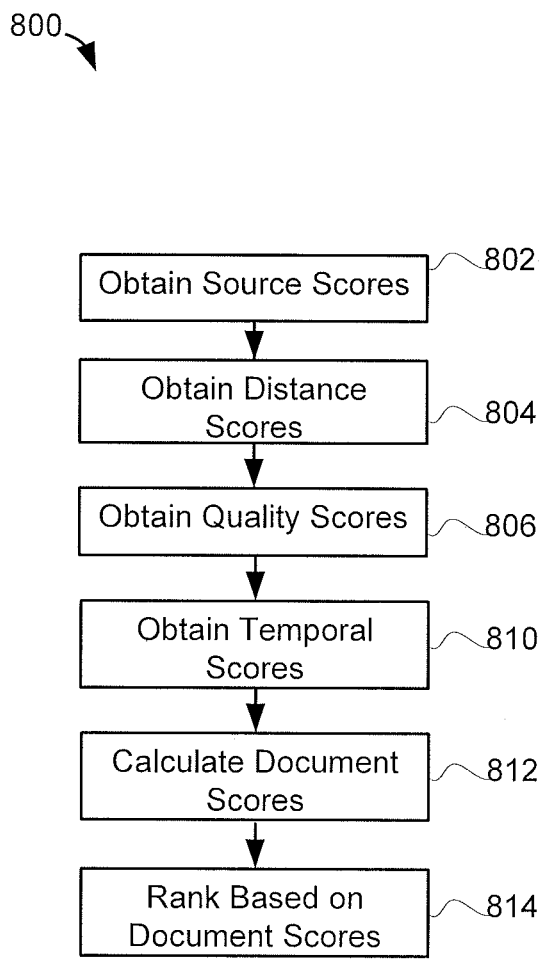
FIG. 8 is a flowchart of a process for ranking documents in a cluster in accordance with an embodiment of the present disclosure.

Referring now to FIG. 8, a process 800 for ranking documents within a cluster is illustrated. The process 800 includes steps or operations which may be performed by the ranking system 150. More particularly, the ranking module 232 may be configured to perform the process 800 of FIG. 8. That is, the ranking module 232 may contain instructions for causing the processor 240 to execute the process 800 of FIG. 8.

First, at step 802, the ranking system 150 obtains a source score for a document. The source score is a score which is related to the location from which the document 120 was obtained. In some embodiments, the ranking system 150 accesses a source score list, which may be stored in memory of the ranking system 150. The source score list associates each source of documents with a score. The source of the document identifies the location from which the document was retrieved. For example, the source of the document may relate to the document server 114 on which the document was stored. The source may, for example, be identified by a URL or other locator.

The source score list may be predetermined and may be established to attribute more reputable sources with a higher score.

Next, at step 804, a distance score may be obtained for the document. The distance score identifies how far the document is from the center of the cluster. This may be determined, for example, by calculating the information loss between the document and the cluster summary in the manner described above with reference to FIG. 5. The distance score is a measure of the similarities between the document and the cluster summary.

Next, at step 806, a quality score associated with the document may be obtained. The quality score may be determined in a number of different ways and the quality score may be a measure of how good the document is. The quality score may, for example, be determined by analyzing the contents of the document (using predetermined algorithms) to determine how well it is written. For example, the quality score may electronically assess whether the document has been written following grammatical rules.

Next, at step 810, a temporal score associated with the document may be obtained. The temporal score may be determined in dependence on a timestamp associated with the document. Newer documents are attributed a higher temporal score than older documents. The timestamp may relate to a date and/or time when the document was obtained by the document clustering system 160 or a date and/or time when the document was authored or published. The timestamp may indicate the freshness of the document.

Next, at step 812, a document score may be calculated by the ranking system 150 based on any one or more of the: source score, distance score, quality score, and/or temporal score or other scores not specifically discussed above.

The document score may be calculated by performing a weighted linear combination on any of the: source score, distance score, quality score, and/or temporal score. In other embodiments, the document score may be determined by applying a more complex non-linear function to any of the source score, distance score, quality score, and/or temporal score.

Steps 802 to 812 may be performed for all documents in the cluster in order to determine a document score for all documents in a cluster.

Next, at step 814, the documents within the cluster are ranked based on the relative document scores determined at step 812.

It will be appreciated that, while FIG. 8 illustrates an embodiment in which a source score, distance score, quality score, and a temporal score are calculated, in other embodiments, only a subset of these scores may be calculated. Furthermore, other scores may be used.

Figure 9:
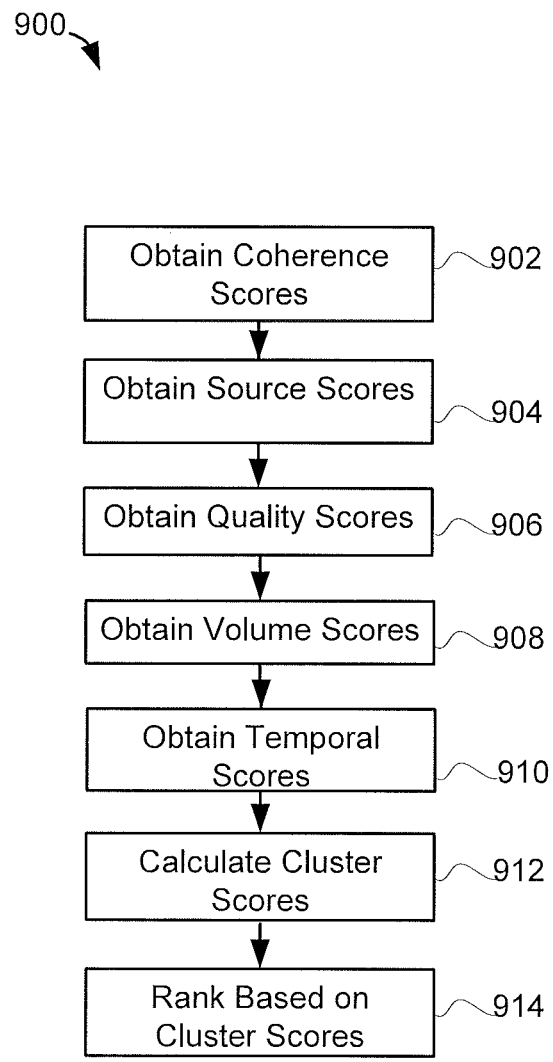
FIG. 9 is a flowchart of a process for ranking clusters in accordance with an embodiment of the present disclosure.

Referring now to FIG. 9, a process 900 for ranking clusters is illustrated. The process 900 includes steps or operations which may be performed by the ranking system 150. More particularly, the ranking module 232 may be configured to perform the process 900 of FIG. 9. That is, the ranking module 232 may contain instructions for causing the processor 240 to execute the process 900 of FIG. 9.

First, at step 902, the ranking system identifies the features which may be considered as the features which are mostly responsible for the creation of the cluster. This may be done, for example, by calculating a cumulative predictive ability of features of the cluster summary. The cumulative predictive ability is the ability for all features of the cluster to predict whether a document is part of that cluster. The cumulative predictive ability defines a cluster's coherence score.

The Predictive Ability (PA) of the individual features of clusters may be defined before and after the clustering of every batch of input documents. Given a cluster $C_j$ from a clustering $C=\{C_1, C_2, \ldots, C_k\}$, and a feature $f_i$ from the set of features $F=\{f_1, f_2, \ldots, f_q\}$ seen so far in our system, the PA of a feature $f_i$, $PA(f_i)$, is given by the following expression:

$$PA(f_i)=P(C_j) \cdot [P(f_i|C_j)^2 - P(f_i)^2]$$

In other words, $PA(f_i)$ measures the expected increase in the document clustering system's 160 ability to predict whether particular documents of a cluster, $C_j$, possess a feature $f_i$, given reliable information as to when a document is a member of $C_j$.

The predictive ability is a measure of the probability of the appearance of a feature inside a cluster as compared with the probability of appearance of the feature outside of the cluster.

A cumulative predictive ability for a cluster may be determined by summing the predictive abilities for all features, q, possessed by the documents of a cluster, $C_j$.

Summing the PA measure across all features q, possessed by the objects of $C_j$, the Cumulative Predictive Ability (CPA) may be determined as:

$$CPA(C_j,F)=P(C_j) \cdot \Sigma_{i:\{1 \ldots q\}} [P(f_i|C_j)^2 - P(f_i)^2]$$

Next, at step 904, the ranking system obtains a source score for the cluster. The source score is a score which is related to the location from which the documents contained in the cluster were obtained. The location from which the document was obtained may be referred to as the document stream. The source score may be obtained based on the fraction of documents inside the cluster corresponding to each stream and weighting the fractions according to stream weights. The stream weights may be predetermined. In some embodiments, stream weights are stored in memory of the ranking system 150 and the ranking system retrieves the stream weights from memory and applies the stream weights to the fractions. That is, the source score of step 904 may be determined according to a weighted sum of the fraction of objects inside the cluster corresponding to each stream. The weight applied to each fraction may be the stream weights.

Next, at step 906, the ranking system obtains a quality score for the cluster. The quality score is related to the quality of the document contained in the cluster.

In some embodiments, in order to obtain the quality score of the cluster, a quality score for each document of the cluster is obtained. This may be done in the manner described above with reference to step 806 of FIG. 8. The quality score for a document may, for example, be determined in a number of different ways and the quality score of a document may be a measure of how good the document is. The quality score of a document may, for example, be determined by analyzing the contents of the document to determine how well it is written. For example, the quality score of a document may electronically assess whether the document has been written following grammatical rules.

The quality score of a cluster may be determined based on the quality scores of the documents contained in the cluster. For example, the quality score may be any aggregate measure of the quality of documents in the cluster, such as, for example, a weighted average, minimum, maximum, etc.

Next, at step 908, in some embodiments, the ranking system obtains a volume score for the cluster. The volume score may be determined according to a predetermined function which causes the volume score to increase in response to an increase in the number of documents in a cluster. That is, the volume score is calculated so that a first cluster will have a higher volume score than a second cluster if the first cluster contains more documents than the second cluster but will have a lower score than the second cluster if the first cluster contains less documents than the second cluster. In some embodiments, the cluster score may be a count of the number of documents in the cluster.

Next, at step 910, a temporal score associated with the cluster may be obtained by the ranking system 150. The temporal score may be obtained in dependence on one or more timestamps associated with the cluster. That is, the temporal score may be obtained based on a cluster age associated with the cluster. Cluster age may be defined based on timestamps of documents in the cluster. For example, cluster age may be a minimum, maximum or average timestamp associated with the cluster. For example, in some embodiments, the temporal score may be a function of the age of the oldest document in the cluster. In some embodiments, the temporal score may be a function of the age of the most recent document in the cluster. In some embodiments, the temporal score may be a function of the average age of the documents in the cluster.

Next, at step 912, a cluster score is calculated for the cluster based on any one or combination of the scores determined at steps 902 to 910. That is, the cluster score may be calculated based on any one or combination of: the coherence score, the source score, the quality score, the volume score, and/or the temporal score.

The cluster score may be calculated by performing a weighted linear combination on any combination of the: the coherence score, the source score, the quality score, the volume score, and/or the temporal score. In other embodiments, the cluster score may be determined by applying a more complex non-linear function to any of the coherence score, the source score, the quality score, the volume score, and/or the temporal score.

Steps 902 to 912 may be performed for all clusters in order to determine a cluster score for all clusters.

Next, at step 914, the clusters are ranked based on the relative cluster scores determined at step 912.

In at least some embodiments, clusters of documents may be sorted in memory according to their cluster scores and/or ranks.

In at least some embodiments, a web based aggregator system may use the ranks determined at step 914 in order to generate web-pages which provide access to the documents based on rank. For example, the generated web-pages may display higher ranked clusters more prominently than lower ranked clusters. In some embodiments, the web based aggregator system may identify the cluster summary having the highest rank and generate a web page which includes links to at least one of the documents in the highest ranked cluster. In some embodiments, the web based aggregator system may identify the document in a cluster having a highest rank and may generate a web-page which includes a link to that document.

It will be appreciated that, while FIG. 9 illustrates an embodiment in which a coherence score, source score, quality score, volume score, and temporal score are calculated, in other embodiments, only a subset of these scores may be used to calculated. Furthermore, in some embodiments, the cluster score may be calculated based on other scores not specifically listed above.

While the present disclosure is primarily described in terms of methods, a person of ordinary skill in the art will understand that the present disclosure is also directed to various apparatus, such as a server and/or a document processing system (such as a document aggregation system 170, document clustering system 160 and/or ranking system 150), including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus and articles of manufacture also come within the scope of the present disclosure.

While the processes 400, 500, 600, 700, 800, 900 of FIGS. 4 to 9 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of assigning a document to one of a plurality of clusters of documents containing related content, the document having at least one feature, each cluster being associated with a cluster summary describing the content of the documents in the cluster and comprising a summary of one or more features of the documents in the cluster, wherein the summary comprises an aggregated feature vector that describes the set of documents summarized, the method comprising:

determining, at a document clustering system, whether the document should be grouped with one or more previously created cluster summaries by comparing the at least one feature of the document with each previously created cluster summary and evaluating the similarity therebetween, the previously created cluster summaries being stored in a memory in a B-tree data structure;

determining that the document should not be grouped with the one or more previously created cluster summaries, and creating, at a document clustering system, a cluster summary based on the content of the document and storing the created cluster summary in the B-tree data structure, wherein the leaf nodes of the B-tree store the cluster summaries;

identifying at least one outlier in the plurality of cluster summaries associated with each of the plurality of clusters;

attempting to merge the at least one outlier into other cluster summaries;

incrementing a merge attempt count each time a merge is attempted; and removing the outlier from the B-tree data structure when the merge attempt count exceeds a predetermined threshold.

2. The method of claim 1, wherein determining whether the document should be grouped with the one or more previously created cluster summaries comprises:

creating a feature vector for the document, the feature vector representing content of the documents;

comparing the feature vector with the one or more previously created cluster summaries to identify the cluster summary that is closest to the feature vector and determining a measure of similarities between the cluster summary and the feature vector;

determining whether the cluster summary that was identified as the closest to the feature vector is sufficiently close to the feature vector by comparing the measure of the similarities with one or more predetermined thresholds; and if the cluster summary that was identified as the closest to the feature vector is not sufficiently close, then determining that the document should not be grouped with the one or more previously created cluster summaries.

3. The method of claim 2, further comprising:
if it is determined that the document should be grouped with the one or more previously created cluster summaries then adding the feature vector to the cluster summary that was identified as the closest to the feature vector.

4. The method of claim 2, wherein creating a feature vector comprises:
parsing the document to create a list of words used in the document;
obtaining a count of the number of occurrences of each word in the list; and
creating the feature vector in dependence on the list of words and the count.

5. The method of claim 2, wherein the measure of similarities between the cluster summary and the feature vector is a measure of the information loss that would occur if the feature vector were added to the cluster summary.

6. The method of claim 5, wherein the measure of similarities between the cluster summary and the feature vector is the weighted Jensen-Shannon divergence.

7. The method of claim 1, further comprising:
cleaning up the B-tree by reducing the number of cluster summaries in the B-tree.

8. The method of claim 1, wherein identifying at least one outlier comprises: identifying, as outliers, any cluster summaries which summarize a single document.

9. The method of claim 1, wherein identifying at least one outlier comprises:
identifying, as outliers, any cluster summaries which describe the content of multiple identical documents.

10. The method of claim 1, further comprising:
ranking each document in the cluster.

11. The method of claim 10, wherein the documents are ranked based on a predetermined source score which is associated with the source that the document came from.

12. The method of claim 10, wherein ranking each document in the cluster comprises:
for each document in the cluster, calculating a measure of the similarities between the document and the cluster summary which describes the content of that document; and
ranking the document based on the measure of the similarities between the document and the cluster summary.

13. The method of claim 10, wherein the documents are ranked based on a time stamp associated with the documents, the time stamp indicating the freshness of the document.

14. The method of claim 10, further comprising:
identifying the document having the highest rank in the cluster;

generating a web-page including links to the identified document.

15. The method of claim 10, further comprising:
ranking each cluster.

16. The method of claim 15, further comprising:
identifying the cluster summary having the highest rank in the cluster;
generating a web-page including links to at least one of the documents in the identified cluster.

17. The method of claim 15, wherein ranking each cluster comprises:
for each cluster summary, calculating a coherence score for the cluster summary; and
ranking the clusters based on the coherence score.

18. A document clustering system for assigning a document to one of a plurality of clusters of documents containing related content, the document having at least one feature, each cluster being associated with a cluster summary describing the content of the documents in the cluster and comprising a summary of one or more features of the documents in the cluster, wherein the summary comprises an aggregated feature vector that describes the set of documents summarized, the document clustering system comprising:
a memory for storing one or more previously created cluster summaries, the previously created cluster summaries being stored in the memory in a B-tree data structure;
one or more processors, configured to:
determine whether the document should be grouped with one or more of the previously created cluster summaries by comparing the at least one feature of the document with each previously created cluster summary and evaluating the similarity therebetween;
determine that the document should not be grouped with the one or more previously created cluster summaries, and create a cluster summary based on the content of the document and store the created cluster summary in the B-tree data structure, wherein the leaf nodes of the B-tree store the cluster summaries;
identify at least one outlier in the plurality of cluster summaries associated with each of the plurality of clusters;
attempt to merge the at least one outlier into other cluster summaries;
increment a merge attempt count each time a merge is attempted; and
remove the outlier from the B-tree data structure when the merge attempt count exceeds a predetermined threshold.

19. The document clustering system of claim 18, wherein determining whether the document should be grouped with the one or more previously created cluster summaries comprises:
creating a feature vector for the document, the feature vector representing content of the documents; comparing the feature vector with the one or more previously created cluster summaries to identify the cluster summary that is closest to the feature vector and determining a measure of similarities between the cluster summary and the feature vector;
determining whether the cluster summary that was identified as the closest to the feature vector is sufficiently close to the feature vector by comparing the measure of the similarities with one or more predetermined thresholds; and
if the cluster summary that was identified as the closest to the feature vector is not sufficiently close, then determining that the document should not be grouped with the one or more previously created cluster summaries.

20. The document clustering system of claim 19, wherein the processor is further configured to:
if it is determined that the document should be grouped with the one or more previously created cluster summaries then add the feature vector to the cluster summary that was identified as the closest to the feature vector.

21. The document clustering system of claim 19, wherein creating a feature vector comprises:
parsing the document to create a list of words used in the document;
obtaining a count of the number of occurrences of each word in the list; and
creating the feature vector in dependence on the list of words and the count.

22. The document clustering system of claim 19, wherein the measure of similarities between the cluster summary and the feature vector is a measure of the information loss that would occur if the feature vector were added to the cluster summary.

23. The document clustering system of claim 22, wherein the measure of similarities between the cluster summary and the feature vector is the weighted Jensen-Shannon divergence.

24. The document clustering system of claim 18, wherein the processor is further configured to:
clean up the B-tree by reducing the number of cluster summaries in the B-tree.

25. The document clustering system of claim 18, wherein identifying at least one outlier comprises:
identifying, as outliers, any cluster summaries which summarize a single document.

26. The document clustering system of claim 18, wherein identifying at least one outlier comprises:
identifying, as outliers, any cluster summaries which describe the contents of multiple identical documents.

27. The document clustering system of claim 18, wherein the processor is further configured to:
rank each document in the cluster.

28. The document clustering system of claim 27, wherein the documents are ranked based on a predetermined source score which is associated with the source that the document came from.

29. The document clustering system of claim 27, wherein ranking each document in the cluster comprises:
for each document in the cluster, calculating a measure of the similarities between the document and the cluster summary which describes the content of that document; and
ranking the document based on the measure of the similarities between the document and the cluster summary.

30. The document clustering system of claim 27, wherein the documents are ranked based on a time stamp associated with the documents, the time stamp indicating the freshness of the document.

31. The document clustering system of claim 27, wherein the processor is further configured to:
identify the document having the highest rank in the cluster;
generate a web-page including links to the identified document.

32. The document clustering system of claim 27, wherein the processor is further configured to: rank each cluster.

33. The document clustering system of claim 32, wherein the processor is further configured to:
identify the cluster summary having the highest rank in the cluster;
generate a web-page including, links to at least one of the documents in the identified cluster.

34. The document clustering system of claim 32, wherein ranking each cluster comprises:
for each cluster summary, calculating a coherence score for the cluster summary; and
ranking the clusters based on the coherence score.

* * * * *